United States Patent
Dholakia et al.

(10) Patent No.: US 8,871,098 B2
(45) Date of Patent: Oct. 28, 2014

(54) GAS DISPERSION APPARATUS FOR IMPROVED GAS-LIQUID MASS TRANSFER

(75) Inventors: Vipul P. Dholakia, Macungie, PA (US); Annemarie Ott Weist, Macungie, PA (US); David Lee Mitchell, Jr., Coopersburg, PA (US)

(73) Assignee: Air Products and Chemicals, Inc., Allentown, PA (US)

( * ) Notice: Subject to any disclaimer, the term of this patent is extended or adjusted under 35 U.S.C. 154(b) by 580 days.

(21) Appl. No.: 13/240,000

(22) Filed: Sep. 22, 2011

(65) Prior Publication Data

US 2013/0075345 A1    Mar. 28, 2013

(51) Int. Cl.
*C02F 1/78*        (2006.01)
*C02F 101/30*     (2006.01)
*C02F 1/72*        (2006.01)
*C02F 101/36*     (2006.01)

(52) U.S. Cl.
CPC ............. *C02F 1/78* (2013.01); *C02F 2101/305* (2013.01); *C02F 2209/235* (2013.01); *C02F 2209/03* (2013.01); *C02F 1/722* (2013.01); *C02F 2101/306* (2013.01); *C02F 1/725* (2013.01); *C02F 2201/782* (2013.01); *C02F 2301/066* (2013.01); *C02F 2201/784* (2013.01); *C02F 2209/40* (2013.01); *C02F 2101/366* (2013.01); *C02F 2303/18* (2013.01); *C02F 2209/23* (2013.01)
USPC ........... 210/750; 210/759; 210/760; 210/763; 210/765

(58) Field of Classification Search
CPC ............ C02F 1/722; C02F 1/728; C02F 1/78; C02F 2101/305; C02F 2101/306; C02F 2101/36; C02F 2101/363; C02F 2101/366; C02F 2201/78; C02F 2201/782; C02F 2201/784; C02F 2301/43; C02F 2301/46; C02F 2302/18

USPC .......................... 210/750, 759, 760, 763, 765
See application file for complete search history.

(56) References Cited

U.S. PATENT DOCUMENTS

| 4,252,654 | A | 2/1981 | Leitzke et al. |
| 4,255,257 | A | 3/1981 | Greiner et al. |
| 5,273,664 | A | 12/1993 | Schulz |
| 5,302,356 | A | 4/1994 | Shadman et al. |
| 5,374,599 | A | 12/1994 | Ishii et al. |

(Continued)

FOREIGN PATENT DOCUMENTS

| DE | 10062097 A1 | 6/2002 |
| EP | 2 366 671 A1 | 9/2011 |

(Continued)

*Primary Examiner* — Lucas Stelling
(74) *Attorney, Agent, or Firm* — Amy Carr-Trexler; Rosaleen P. Morris-Oskanian

(57) ABSTRACT

The invention discloses an apparatus and method to uniformly disperse ozone gas bubbles into liquid phase water for the treatment thereof. The apparatus consists of a water inlet section connected with a section with structured packing or monolith having parallel flow channels. A portion of the influent water is withdrawn from the main water stream as a side stream, pressurized by a pump, mixed with ozone-containing gas, and then injected back into the main water flow. The side stream may be divided into multiple streams either before or after mixing with the ozone-containing gas, and then injected into the main flow section upstream of the packed section. In alternate embodiments, the ozone-containing gas can be injected directly through the gas diffusers just upstream of the packed section in order to achieve uniform concentration of gas and liquid in the fluid entering the monolith.

14 Claims, 5 Drawing Sheets

(56) References Cited

U.S. PATENT DOCUMENTS

| | | |
|---|---|---|
| 5,674,312 A | 10/1997 | Mazzei |
| 6,730,214 B2 | 5/2004 | Mazzei |
| 2006/0243672 A1 | 11/2006 | Leeuwen et al. |
| 2008/0116149 A1 | 5/2008 | Dick et al. |
| 2008/0210642 A1* | 9/2008 | Philippon ............... 210/760 |

FOREIGN PATENT DOCUMENTS

| | | |
|---|---|---|
| EP | 2366671 A1 | 9/2011 |
| JP | 2000-167575 A | 6/2000 |
| JP | 2000167575 A2 | 6/2000 |
| JP | 2001-225088 A | 8/2001 |
| JP | 2001225088 | 8/2001 |
| JP | 2002320984 A2 | 11/2002 |
| JP | 2003094076 | 4/2003 |
| WO | 9714657 | 4/1997 |
| WO | 03084652 | 10/2003 |
| WO | 2009117141 A1 | 9/2009 |

\* cited by examiner

GAS DISPERSION APPARATUS FOR IMPROVED GAS-LIQUID MASS TRANSFER

BACKGROUND OF THE INVENTION

Ozone is a powerful disinfectant and is used to oxidize organic contaminants from drinking water, including the naturally occurring taste- and odor-causing compounds. Ozone is also used in the effluent from the secondary treatment of wastewater to remove trace organic contaminants and endocrine disrupting compounds (EDCs) from the water before reuse as indirect potable water or discharge to a water body. EDCs may be found in, for example, pharmaceutical residues, pesticides and herbicides, and many ingredients of personal care products. This application of ozone for the tertiary treatment of wastewater is rising faster than the other uses of ozone due to water scarcity and concerns over the impact of EDCs on aquatic life. For most applications involving treatment of drinking water or municipal wastewater, before disposal to streams and lakes the typical ozone dose is in the range of 3 mg of ozone per liter of water to 5 mg/L. The water flow rate in these applications depends on the population it serves and is usually about 700 $m^3$/h or greater. The ozone dose for treatment of industrial waste water and for specialized applications such as color removal range from 10 mg/L to several hundred mg/L but the water flow rate is lower at around 150 $m^3$/h, or less.

For the synthetic organic contaminants such as MTBE, TCE, 1,4 dioxane, etc. which are typically found in chemical-contaminated ground water sites, an "advanced oxidation" process is used for the water treatment. The advanced oxidation process combines hydrogen peroxide with ozone dissolved in water to produce highly-reactive hydroxyl radicals which oxidize the recalcitrant organic contaminants. Hydroxyl radicals are produced by the reaction between ozone and hydrogen peroxide or a catalyst in the aqueous phase. The advanced oxidation process is used to treat industrial process water for reuse in the plant, or before discharge of the contaminated effluent to municipal sewers or the environment.

Ozone gas is commonly produced in a corona discharge-based generator from air or high-purity oxygen. The typical concentration of ozone in gas phase ranges from 3 to 14% depending on the generator power and concentration of oxygen in the gas feed used for ozone generation. Ozone-based water treatment processes depend upon transfer of ozone from the gas phase to the water phase for oxidation of organic contaminants. Various processes have been used to transfer ozone from gas phase to liquid phase for the purposes of water treatment.

All of these processes depend on creating mixing or relative motion at the gas-liquid interface, and the ozone solubility at the process-operating conditions to transfer ozone from gas phase to liquid phase. Key criteria for selection of equipment include the energy consumed during operation, the desired ozone dose rate, the cost and size of the equipment, and the ozone mass-transfer efficiency. The ozone mass-transfer efficiency is defined as the percentage of the ozone gas that is introduced during the process that is dissolved in the aqueous phase. To increase the amount of ozone transferred and thus the ozone mass-transfer efficiency, it is desirable to use high-concentration ozone of approximately 8% or higher (by weight) at an operating pressure higher than the atmospheric pressure. The high ozone concentration reduces the amount of gas that has to be handled in the gas-liquid mixing apparatus and increases the solubility of ozone in the water. Operating the process at higher than the atmospheric pressure also increases the solubility of ozone in water. The combined effect of the high ozone concentration and higher operating pressure is an increased gas mass-transfer driving force, which improves the ozone mass-transfer efficiency. The residual ozone in the effluent gas stream from the process represents the energy that is wasted in the ozone generator and results in increased oxygen costs. The effluent gas stream has to be passed through an ozone-destruct unit in order to remove the undissolved ozone before discharging the gas safely to the atmosphere.

Commercial ozone generators typically produce ozone at 15 psig to 30 psig (103.4 kPa to 206.8 kPa) gas pressure. At higher pressures, the energy efficiency and generating capacity of corona discharge generators is reduced, making it more expensive to produce ozone at pressures greater than 15 psig (103.4 kPa). This limits the economical ozone gas source to 15 psig (103.4 kPa). To take advantage of the better mass-transfer efficiency at high gas pressure, a venturi eductor-based process is favored over other methods that operate at or slightly above the atmospheric pressure. However, the venturi eductor by itself provides a low dissolution of ozone from gas phase to water. The mass transfer occurs mostly in the throat section where the gas is aspirated by the motive water stream. Downstream of the eductor, mixing is inefficient and provides only limited additional mass transfer. To improve ozone dissolution downstream of the eductor, static mixers are used. The static mixer requires high fluid velocities passing through it in order to mix gas into water for ozone transfer. The minimum velocity required is specific to the static mixer and results in a large pressure drop across the mixer, thus increasing the energy requirements for the process.

One known process for the transfer of ozone from gas phase to liquid phase for the purposes of water treatment is a bubble column or basin reactor, which comprises a large column or basin and gas diffusers located at the bottom of the column or basin. In some embodiments, the gas diffusers may be located under approximately 15 to 20 feet (4.6 to 6.1 meters) of water. The column or basin is continuously filled with contaminated water and ozone gas is introduced through the gas diffusers. Fine bubbles of ozone gas rise through the water in the column or basin, which provides mixing and turbulence of the water in the basin and promotes dissolution of the ozone into the water (also referred to herein as "ozone transfer"). Ozone transfer efficiency can be improved by capturing and recirculating undissolved ozone from the top of the column or basin and/or passing the ozone through a series of columns or basins using baffles. Depending on the ozone dose and the basin design, in some embodiments one or two sections of the basin are used for gas sparging and the remaining sections are used to achieve the dissolved gas removal and the desired ozone contact time (CT) for the water. The treated water is removed from the basin after the desired CT has been reached.

The basin contactor process operates within a narrow range of total gas-flow rates in order to achieve good mixing and mass transfer in the basin. If the total gas flow rate is reduced, the gas bubbles rise through the water column without significant mixing or turbulence in the water. This reduces the ozone mass-transfer efficiency in the contactor. As ozone gas generation is the major cost of the process, the reduced ozone mass-transfer efficiency in the contactor makes the process less economical. The lack of proper mixing due to reduced gas flow also leads to non-uniform distribution of ozone in the basin, and could reduce the CT below that required by the relevant water-disinfection regulations. To overcome these problems, the total gas flow rate is maintained constant by lowering the ozone concentration in the gas. A typical ozone treatment process uses high purity oxygen as the feed gas to generate ozone. When the ozone concentration in the feed gas is reduced in response to low ozone demand, either due to a low water-flow rate or a lower contaminant concentration, a greater amount of high-purity oxygen is required per unit mass of ozone to maintain the constant total flow of gas through the bubble diffusers. The use of a large fraction of high-purity oxygen increases the unit cost of treating water and results in a waste of energy during periods of low ozone demand.

Another drawback to the use of a basin contactor is that the fine pores in the gas diffuser (often micron size) clog over time, and thereby significantly affect the performance of the contactor. Clogging of the diffusers requires that they be cleaned or replaced periodically, leading to process downtime and increased maintenance costs. The treatment of wastewater is also a greater challenge for the traditional fine-bubble diffuser-based basin contactor method as the wastewater carries a higher concentration of the fine suspended solids in it that lead to frequent clogging of the diffuser and poor performance in the contactor. Water flow rates in both drinking water and wastewater treatment plants vary significantly during the day and over the seasons, which makes operation of most traditional contacting methods expensive during low ozone-demand periods. Other disadvantages of the diffuser-based process include that: large, deep basins are required for effective transfer of ozone to water, thus increasing costs and space requirements; channeling of gas bubbles reduces the efficiency of mass transfer; and the process is not amenable to high-pressure operation, which would increase the dissolution of the ozone gas in water.

Another known ozone transfer method is the use of a venturi ejector, in which water flows through the venturi and ozone gas is educted at the throat of the venturi. This venturi-based method can only be used effectively in systems with relatively low water flow rates. In systems that operate at relatively large flow rates, a portion of the water can be diverted into a "slip stream" on which the venturi is located. The slip stream is then injected back into the main stream and mixed into the main stream by turbulent flow. The diverted stream venturi method is typically only effective for relatively low-dose ozone transfer (e.g., 10 mg/L or less). This method also requires high cross-flow velocity of the influent water in the main pipe to provide mixing of two-phase flow from the jet into the main flow and to carry the mixed stream a longer distance in the pipe than in a slow-moving water flow. The purpose of the high-velocity jet is to achieve additional ozone transfer in the main flow through rapid dissipation of the turbulent energy of the jets. The high velocity of the two-phase jet required for effective mixing and mass transfer of ozone in the main flow leads to a high pressure drop across the injection nozzles. The high pressure drop represents energy that is wasted to achieve the ozone transfer and is supplied by the side stream pump. The energy requirement for this method is typically much greater than that for the basin contactor.

In another variation of venturi-based ozone transfer, static mixers can be used downstream from the educator or gas-injection nozzle to achieve additional mixing and dissolution of ozone in the water phase. The system is simpler to design as it has no moving parts. But the mixing and gas dispersion for good ozone transfer through a static mixer requires a highly-turbulent flow of gas and liquid. This requires high gas-liquid velocity through the static mixer which results in a higher pressure drop across it than any other process of gas dissolution. The minimum gas-liquid velocity required is specific to the static mixer used and the process can only be operated in a narrow range of water and gas flow rates to achieve the turbulent flow needed for ozone dissolution. The efficiency of the ozone transfer suffers dramatically when the water flow rate is reduced below the optimum operating range for the static mixer. This is a huge challenge for the plant operations because in drinking water and wastewater plants the water-flow rate changes considerably with demand during the day and over the seasons.

There have been attempts to perform ozone transfer using turbine contactors, which operate by aspirating gas through hollow turbine shafts and agitators. Turbine contactors do not appear to be well-suited to ozone transfer applications for several reasons. As compared to the ozone transfer methods described above, turbine contactors have relatively high power requirements. In addition, the ratio of ozone gas to water entering the turbine contactor must be kept relatively constant for efficient operation, which limits the ability to adjust ozone dosing. Turbine contactors are not well-suited for catalytic ozonation because the powdered catalyst will plug the channels through which the ozone gas is aspirated.

Packed columns are rarely used for ozone transfer into liquid phase because this type of reactor has very low ozone mass-transfer efficiency, and therefore a very tall column is required to achieve typical ozone dosing. Packed columns also have low void volume, which limits the water flow rate through a given diameter column. Packed columns can be used for fixed bed catalytic reactions with ozone but, due to low mass-transfer efficiency of ozone, are expensive to build and operate.

Impinging jets have also been used to enhance mixing between gas and liquid phases in ozone-transfer systems. In such systems, a high-velocity jet of two phase flow is impacted with another two-phase flow jet or with a stationary surface. In these impinging-jet processes, two jets of gas-liquid stream are impacted at high velocity from opposite sides. A portion of the treated water may be recycled and mixed with the influent contaminated water, and then fed through a pump to form the jets. In addition, undissolved ozone may be captured downstream in a phase separator and recycled through the jets. Impinging jets can be used as the sole mixing reactor, or can be used in combination with other mixing reactors. The design and operation of an ozone transfer system including impinging jets is complex due to the need for precision location of the impact zones. In addition, the jets have high power requirements and the range of flow rates that can be accommodated by this type of system is limited. Accordingly, this method is rarely used for large-volume water treatment applications, for example drinking- and wastewater-treatment applications.

Accordingly, there is a need for an improved method of ozone transfer that overcomes the deficiencies of the methods of the prior art.

BRIEF SUMMARY OF THE INVENTION

In one respect, the invention comprises, a method for treating water, the method comprising:
(a) routing a water stream through a pre-treatment line;
(b) introducing the water stream from the pre-treatment line into an expansion section including an upstream end having a first cross-sectional area and a downstream end having a second cross-sectional area, the second cross-sectional area being greater than the first cross-sectional area;
(c) providing a gas stream containing at least 3% ozone gas;
(d) introducing the gas stream into the expansion section at at least one injection point while the water stream is flowing through the expansion section, resulting in a gas-liquid mixed-phase stream comprising ozone gas and water at the downstream end; and (e) passing the mixed-phase stream through a monolith located downstream from the expansion section, resulting in a reaction product in which at least a portion of the ozone gas is dissolved into the water.

In another respect, the invention comprises a water treatment system comprising:

a pre-treatment line including a water stream; an expansion section connected in flow communication along the pre-treatment line, the expansion section comprising an upstream end having a first cross-sectional area and a downstream end having a second cross-sectional area, the second cross-sectional area being greater than the first cross-sectional area; a gas stream containing at least 3% ozone gas, the gas stream being in flow communication with the expansion section at least one injection point; and a monolith having an outlet end and an inlet end and being in flow communication with the pre-treatment line, the outlet and inlet ends being downstream from the expansion section, the monolith having a plurality of channels therein through which the water stream and gas stream may travel.

In yet another respect, the invention comprises a method of treating water, the method comprising:

(a) routing a water stream through a pre-treatment line;

(b) diverting a portion of the water stream from the pre-treatment line into at least one side stream, the side stream branching off of the pre-treatment line at a diversion point;

(c) providing an output gas stream containing ozone gas;

(d) introducing the output gas stream to the water in the at least one side stream at at least one injection point, resulting in a mixed-phase stream comprising ozone gas and water downstream of the at least one injection point;

(e) introducing the mixed-phase stream into the water stream at a reintroduction point located downstream from the diversion point.

DETAILED DESCRIPTION OF THE EMBODIMENTS OF THE INVENTION

Figure 1:
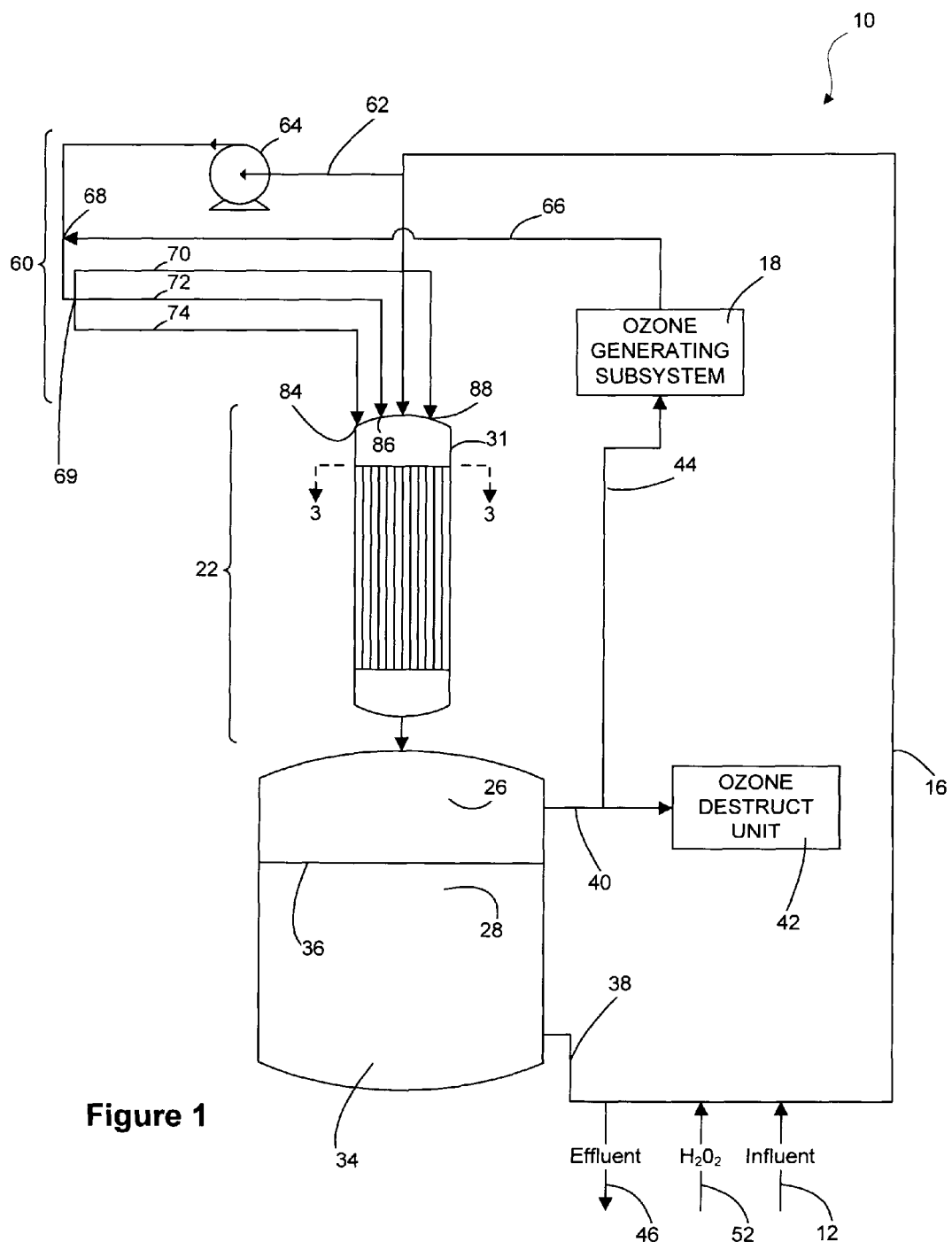
FIG. 1 is a schematic diagram of a first exemplary embodiment of the present invention.

Unless otherwise stated herein, any and all percentages identified in the specification, drawings and claims should be understood to be on a weight percentage basis.

Unless otherwise stated herein, any and all pressures identified in the specification, drawings and claims should be understood to mean gauge pressure.

As used in the specification and claims, the term "flow communication" is intended to mean that two or more elements are connected (either directly or indirectly) in a manner that enables fluids to flow between the elements, including connections that may contain valves, gates, or other devices that may selectively restrict fluid flow.

As used in the specification and claims, the terms "ozone transfer," "ozone mass transfer," and "ozone dissolution" are all intended to refer to the dissolution of ozone gas into water.

To aid in describing the invention, directional terms may be used in the specification and claims to describe portions of the present invention (e.g., upper, lower, left, right, etc.). These directional terms are merely intended to assist in describing and claiming the invention and are not intended to limit the invention in any way.

In the claims, letters are used to identify claimed steps (e.g. (a), (b), and (c)). These letters are used to aid in referring to the method steps and are not intended to indicate the order in which claimed steps are performed, unless and only to the extent that such order is specifically recited in the claims.

The method according to the present invention provides an efficient gas-liquid contacting process in a simple and compact system with very few moving parts that require costly maintenance or consume large amount of energy. The traditional processes for water treatment and disinfection with ozone use either bubble diffusers for ozone-containing gas injection in a continuous flow-basin contactor, or gas injection through a venturi eductor or nozzle, with or without static mixers, in a pipe. The basin contactor with bubble diffusers provides poor mixing of gas and water in the contacting section and is inefficient for ozone gas transfer. It operates within the narrow design range for gas flow which leads to constant gas flow rate operation by reducing the ozone concentration in the gas during periods of low water flow rate. When the ozone concentration is reduced to maintain the constant gas flow rate, higher amounts of pure oxygen gas must be used per unit volume of water treated. This represents wasted energy and higher operating costs during periods of low water flow rates. The basin contactor also operates at atmospheric pressure so that an ozonation step cannot be added as a retrofit without additional pumps or water pressurization methods being used to withdraw treated water from the basin.

The in-line pipe contactor is a plug flow reactor with gas introduction in the water stream through a gas nozzle, venturi educator, or two-phase jet. This type of contactor also operates within the narrow specifications for water and gas velocity ranges and has low ozone mass transfer efficiency. If the static mixers are used in the pipe reactor for mixing downstream of the gas injection point, the ozone utilization is improved within the static mixers' design range. But that leads to complex reactor design and higher operating costs due to the large pressure drop of turbulent flow required for mixing in the static mixers.

A more versatile ozone transfer process is desired that has a wider operating range, lower energy consumption, and higher ozone-transfer efficiency. The invention disclosed herein achieves one or more of these goals. The traditional process of injecting gas such as the use of an inline venturi eductor, inline static mixer, or gas nozzle will not result in the same degree of gas dispersion required at the entrance of the packed section as that achieved by the apparatus described in this application. The apparatus disclosed herein can be easily incorporated in an existing water treatment plant with minor modifications as a retrofit. This invention can be used with water supplies at any pressure, unlike the basin contactor process where the water supply must be kept at atmospheric pressure. It also allows for use of the economical ozone generators, which operate at around 15 psig (103.4 kPa) with very good ozone mass transfer efficiency, even if the water to be treated is at a pressure higher than 15 psig (103.4 kPa).

The invention according to the present application allows transfer of ozone from gas phase to water phase with a high ozone utilization rate. In some embodiments for contacting ozone-containing gas with water according to the present invention, the influent water is passed over a structured packing section containing a monolith after ozone-containing gas bubbles are dispersed in the influent water using two-phase injection nozzles or gas diffusers. The structured packing section is efficient in transferring soluble gas into liquid phase only when the gas is well dispersed prior to entering the packed section. A good dispersion of gas bubbles in water is achieved by withdrawing a portion of the influent water as a side stream, pressurizing the water in the side stream using a suitable liquid flow pump, and then injecting the gas-liquid mixture ahead of the packed section. The ozone containing gas stream is introduced in the side stream through a gas nozzle or a venturi eductor. The gas-liquid mixture in the side stream is split into multiple streams and piped to different locations along the flow conduit. All of the two-phase streams split from the side stream are then injected into the main water flow just ahead of the packed section in order to minimize bubble coalescence and phase segregation. The orientation and the locations of the injection points will depend on the orientation and shape of the packed section.

As an alternate to injecting the two-phase flow in front of the packed section, the ozone-containing gas can also be injected through the gas diffusers directly in front of the packed section. In this case, only the gas is injected into the flow of liquid through the diffuser from an ozone generating source. The placement of the diffusers close to the packed section ensures reduced bubble coalescence, and the use of multiple diffusers shaped to match the shape of the packed section will ensure a uniform distribution of gas bubbles at the entrance of the packed section. The packed section can be oriented horizontally, vertically-up, or vertically-down for the flow of fluid. In some embodiments, the preferred orientation of the packed section is horizontal with round or square cross-sectional microchannels in the monolith to maximize fluid flow and mixing within the microchannels. In some embodiments, the ozone-depleted gas and the treated liquid can be withdrawn downstream from the packed section by any of the traditional means available. For example, the outlet from the packed section can be connected to a basin to achieve desired contact time (CT) and separate the ozone-depleted residual gas. The gas separation and residence time can also be achieved by the use of a degas vessel for gas separation followed by a pipe line contactor for the CT. The method to produce ozone is power intensive and expensive, so it is desirable to maximize ozone utilization in the oxidation process without substantial energy spent in mixing the gas and liquid phases.

The process using embodiments according to the invention described below overcomes the challenges of known processes for ozone dissolution in water and provides a compact system for such dissolution. It is useful for water treatment and disinfection for all sizes of plants but is particularly attractive for water treatment plants that handle flow rates of 700 cubic meters per hour or greater.

One of the primary advantages of the present invention is that this process can be used with water that is at a higher pressure than operating pressure of the ozone generator. In conventional treatment processes in which ozone gas is injected directly in the main water stream, the pressure in the main water stream must be lower than the ozone gas pressure. In these treatment processes, this adds to the operating costs of the system because the ozone generator is not efficiently operated in obtaining the requisite pressure.

In some embodiments according to the present invention, a venturi eductor is used to aspirate ozone gas. The venturi eductor can be designed to operate under the desired water and ozone generator pressure to aspirate a desired amount of ozone gas. This decouples the influent water pressure from the ozone generator pressure and, therefore, both can be operated at their optimum conditions. The apparatuses and methods according to the present invention could be used to treat operating pressures ranging from atmospheric pressure up to approximately 100 psig (689.5 kPa, and in most cases operating water pressures between 5 psig and 50 psig (103.4 kPa and 344.7 kPa).

In the exemplary embodiments described herein, the velocity of the water entering the packed section is decreased by the use of an expansion section which has a greater cross-sectional area than that of the adjacent influent pipe. This approach may be counterintuitive to persons having ordinary skill in the art because many known approaches for oxidation treatment constrict influent water flow for the purpose of increasing the water velocity in the mixing section. The way in which the present invention improves ozone-transfer will be explained in detail below with reference to the exemplary embodiments disclosed.

A first embodiment of an exemplary water treatment system 10 is shown schematically in FIG. 1. In system 10, water to be treated is introduced into a pre-treatment line 16 by a pressurized influent feed stream 12. A portion of the water in the pre-treatment line 16 is diverted into a side stream portion 60 that includes a side stream 62, a pump 64 that circulates water through the side stream portion 60, and a plurality of streams 70,72,74 that split from the side stream 62 at a furcation point 69. The pre-treatment line 16 carries the undiverted water into an expansion section 31.

In this embodiment, the furcation point 69 and streams 70,72,74 are located downstream from a junction 68 where ozone generated by an ozone generating subsystem 18 is introduced into the side stream 62 by an ozone feed line 66. As opposed to previous systems, in the present invention only a portion of the influent water volume is used to create the gas dispersion for the packed section of the mixing section 22. Also, the present invention includes a pumping device (i.e., pump 64) only in the side stream 62 in order to pump the water in the side stream 62 to a pressure that is higher than the pressure of the water located in the pre-treatment line 16. This reduces the energy consumption by pressurizing only the side stream portion 60 of the influent water flow 12 as compared to embodiments where the full influent water flow 12 is pumped through an inline venturi eductor.

In this embodiment, the ozone-containing gas in the ozone feed line 66 is injected into the side stream 62 at the junction 68 either through a gas nozzle or a venturi eductor. The gas-liquid stream in the side stream 62 can optionally then be further mixed by a static mixer to further disperse gas bubbles into the water. In this embodiment, after the water in the side stream 62 has been mixed with ozone at junction 68, the two-phase side stream 62 is then split into a plurality of secondary streams 70,72,74. It should be understood that the side stream 62 could be split into any number of secondary streams within the scope of this invention. Preferably, each of the secondary streams are provided at an approximately equal volumetric flow rate. In this embodiment, the gas-liquid mixture in the streams 70,72,74 is then fed into the expansion section 31 of the mixing section 22 at respective injection points 84,86,88, ahead of a packed section of the mixing section 22. In this embodiment, the packed section comprises a monolith 26.

Any type of traditional injection nozzle can be used to inject the two-phase flow into the expansion section 31. The injection points are located in the expansion section 31 such that they create a substantially uniform distribution of gas bubbles and reduce gas bubble coalescence and phase separation. Splitting the side stream 62 into a plurality of streams (e.g., streams 70,72,74) after mixing ozone gas into the side stream 62 reduces the number of ozone feed lines needed to just one (as seen by the use of single ozone feed line 66 in FIG. 1).

Most commercial ozone generators produce an output gas stream at a pressure of 15 to 30 pounds per square inch (103 to 207 kPa). Typical output gas stream pressures are lower for corona discharge ozone generators, where ozone generating efficiency begins to suffer if the output gas stream pressure exceeds 15 psi (103 kPa). In the embodiment shown in FIG. 1, the preferred pressure range for the pre-treatment line 16 is between 5 and 50 pounds per square inch (34 and 345 kPa). It will be obvious to one of ordinary skill in the art that the preferred range would change as ozone generators capable of operating at higher output gas stream pressures become commercially available.

Figure 2:
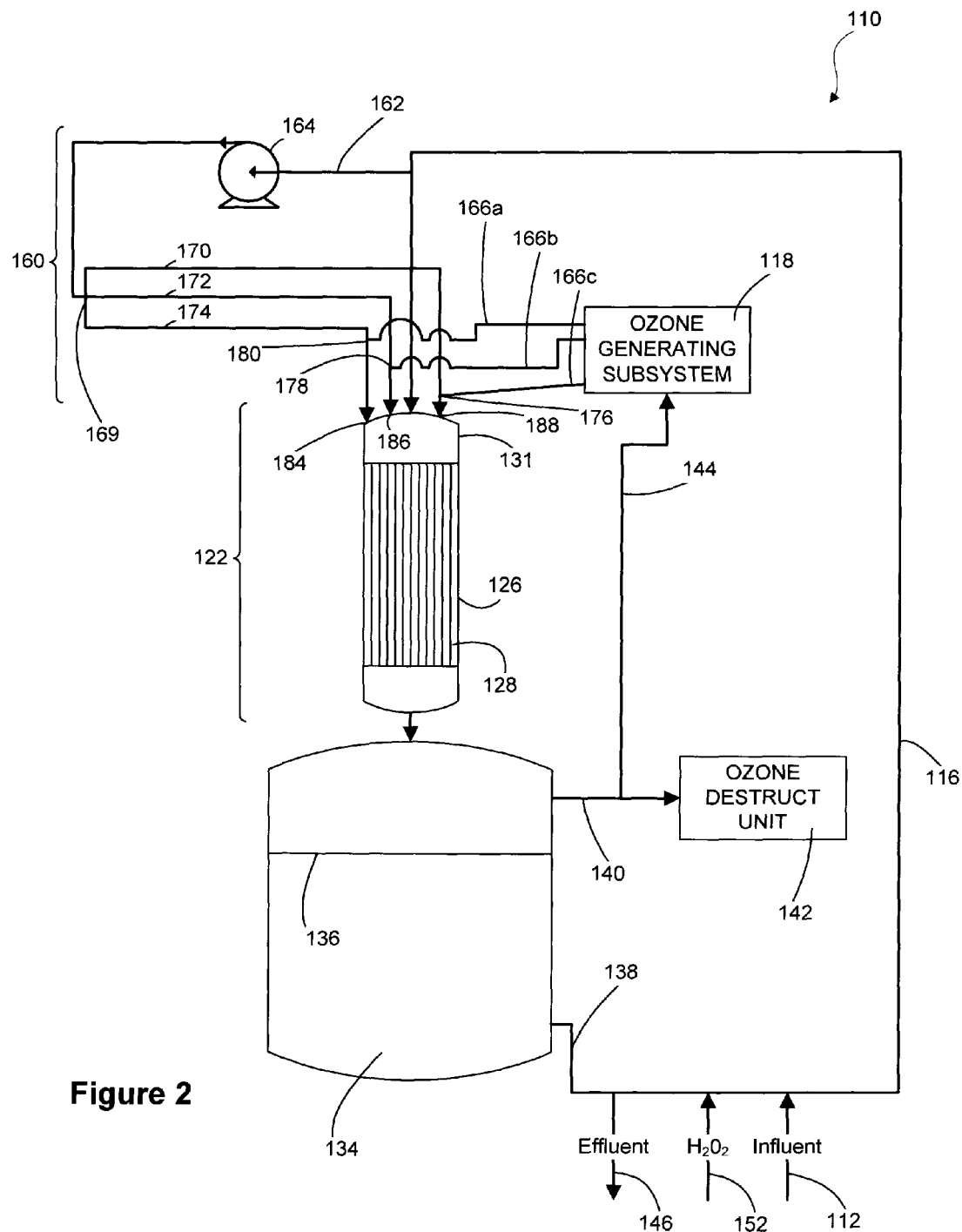
FIG. 2 is a schematic diagram of a second exemplary embodiment of the present invention.

A second embodiment of an exemplary water treatment system 110 is shown schematically in FIG. 2. In this embodiment, elements of the system 110 that are the same as elements in the first embodiment of the system 10 are given a reference numeral increased by 100. For example, the pre-treatment line 16 of the first embodiment of the system 10 is the same as the pre-treatment line 116 of the second embodiment of the system 110. In the interest of clarity, some features of this embodiment that are shared with the first embodiment are numbered in FIG. 2, but are not repeated in the specification. For example, influent feed stream 12 in system 10 corresponds to an influent feed stream 112 in system 110, influent feed stream 312 in system 310, influent feed stream 412 in system 410.

In the embodiment shown in FIG. 2, ozone-containing gas is divided into three ozone feed lines 166a, 166b and 166c, which are each respectively connected to one of the secondary streams 170,172,174 at respective junctions 176,178,180. Like the embodiment of FIG. 1, it should be understood that the side stream 162 could be split into any number of secondary streams. A venturi eductor or any other suitable injection device could be used as the gas injection device for the secondary streams 170,172,174. The secondary streams 170, 172,174 then feed a gas-liquid mixture into the influent water in the expansion section 131. This reduces the need for an additional gas nozzle that may cause a pressure drop in the side stream 162, thus, further reducing the amount of energy consumed by the process. The choice of configuration for the side stream, two-phase flow injection method, and the precise location of the injection nozzles, will depend on many factors such as, for example, the overall volumetric water-flow rate, the ozone dose, the orientation of the packed section, and the nature of the packing in the packed section.

Additional elements of system 10 will now be described. It should be understood that corresponding elements of system disclosure that follows is equally applicable to the embodiments of the system 110 of FIG. 2, system 310 of FIG. 7 and system 410 of FIG. 8. Elements of system 10 that are described in the specification and are present in all of the systems 110, 310, 410 may be represented in the drawings by reference numerals that are increased by a factor of 100, 300 and 410, respectively, but may not be specifically described in the specification. For example, In the example shown in FIG. 1, the ozone generating subsystem 18 comprises a corona discharge ozone generator. The ozone generator includes a feed line of either ambient air, oxygen enriched air, or pure oxygen, depending upon the desired ozone concentration and total amount of ozone in the ozone feed line 66. In this example, a feed line comprising at least 90% oxygen is provided. A typical corona discharge ozone generator converts about 4 to 13% of the oxygen in the feed gas into ozone. Accordingly, the output gas stream from the ozone generating subsystem 18 will contain no less than 3% ozone under normal operating conditions. In other embodiments, any suitable alternative method of generating ozone could be used.

Figure 3:
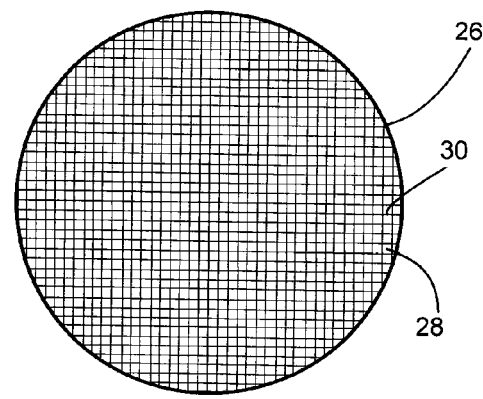
FIG. 3 is a partial sectional view taken along line 3-3 of FIG. 1.

A mixture of ozone gas (from the ozone feed line 66) and water from the pre-treatment line 16 then flows into the mixing section 22. In this example, the mixing section comprises a honeycomb monolith 26. Referring now to FIG. 3, the monolith 26 comprises a unitary structure having walls 30 that define parallel microchannels 28, which preferably fill the cross-sectional area of the monolith 26. In this example, the walls 30 are formed of a ceramic material. Cordierite, ceria-zirconia, alumina, carbon, and titanium dioxide are examples of other suitable substrate materials for the walls 30. Metals, such as stainless steel, would also be suitable substrate materials for the walls 30. For larger diameter monoliths, the structure may comprise a plurality of monoliths segmented to fit the desired cross section.

In this process, the influent water from pre-treatment stream 16 is carried into the mixing section 22 for ozone treatment. The typical water velocity ranges from 1 m/s to 2 m/s in the pre-treatment line 16 and is closer to 2 m/s to keep the pipe size small while also maintaining pressure loss at acceptable levels. The water is then passed through a section that has larger cross section area than the influent water pipe and contains the structured packing or monolith 26 packing with microchannels 28 specifically designed to achieve good gas-to-liquid mass transfer. The packing usually has void volume of 60% to 85% for fluid flow through it. The superficial velocity through the packed section is lower than in the influent water pipe and is in the range of 0.25 m/s to 1 m/s. The higher water velocity through the packing leads to improved mass transfer but it also results in high pressure drop. The pressure drop and the energy consumption increases more rapidly compared to the improvement in the mass transfer from gas phase to liquid phase with the increase in fluid velocity through the structured packing. Therefore, there is an optimum velocity range where both mass transfer and pressure drop are in the acceptable range to make the present invention an efficient ozone dissolution process. The velocity range over which some of the structured packings such as honeycomb monoliths with microchannels operate with acceptable pressure drop and good mass transfer is much wider than for the static mixer. The pressure drop across this packing is also considerably lower compared to static mixers, making it a very attractive method for gas dissolution.

In the example of FIG. 3, the cross-sectional shape of the monolith 26 is circular and the cross-sectional shape of each of the microchannels 28 is square. Many alternative shapes are possible and the monolith 26 and microchannels 28 could either be the same shape or different shapes. For example, the overall cross-sectional shape of the monolith 26 and the cross-sectional shape of the microchannels 28 could be hexagonal. The preferred specifications for the monolith 26 in a specific application will depend upon a number of operating factors, including (but not limited to) the ranges of desired ozone and catalyst dosing, as well as the expected range of water flow rates.

In some embodiments, the walls 30 may be impregnated with a catalyst for water treatment applications in which catalytic reactions are desired, such as catalytic oxidation of organic contaminants such as nitrobenzene, aniline dye wastewater, phenol, polyphenol, etc. Examples of common oxidation catalysts include carbon, palladium, iron, titania, titanium dioxide, copper, manganese, magnesium, ruthenium, and silver.

In one embodiment, the honeycomb monolith 26 based packing has microchannels 28 of approximately 1 mm to 3 mm width. Due to the walls 30, these microchannels 28 are not interconnected so once the fluid enters the channel there is no inter-mixing of fluid from adjacent channels. Minimal fluid exchange occurs at the end of the monolith block, which are typically 3" to 6" long and stacked end to end with another monolith block to achieve the desired length of the packing. The process, therefore, requires good gas dispersion at the entrance of the packing so the majority of channels or the majority of the volume of the packed section is utilized for ozone mass transfer. Once suitable dispersion of gas bubbles in water enters the microchannels 28 of the honeycomb monolith 26 they achieve high gas-liquid mass transfer rate. This is accomplished by the relative motion at the gas-liquid phase boundary established by the circulation flow in the liquid and gas phases due to the friction of the fluid with the channel walls 30. The desired flow profile for good mass transfer is a Taylor flow where slugs of gas and liquid move down the capillary channel in laminar flow. This invention also enables operation of the process at high fluid pressure to take advantage of higher ozone transfer driving forces for water treatment. The total length of the structured packing section can be varied and is chosen to achieve desired ozone mass transfer efficiency for a given ozone dose. In the structured packing section, the monolith blocks are arranged to cover the entire volume of the pipe or conduit section to prevent any by-pass of the gas or liquid along the edges between the monolith and the pipe.

The gas-liquid mixture is preferably supplied to the monolith 26 at an elevated pressure (i.e., above atmospheric pressure), which, as discussed above, increases the ozone mass-transfer efficiency. As noted above, the embodiments according to the present invention reduce the energy consumption by pressurizing only the side stream portion 60 of the influent water flow 12 as compared to embodiments where the full influent water flow 12 is pumped through an inline venturi eductor.

To achieve the desired distribution of gas phase in the structured packing section for the high gas mass transfer efficiency the gas bubbles have to be uniformly dispersed upstream of the structured packing section entrance. In this embodiment, the uniform dispersion has to be accomplished while the velocity of water is reduced from the influent pipe velocity of about 2 m/s to packed section velocity of 0.25 m/s to 1 m/s. This reduction in velocity is achieved by housing the structured packing section in a pipe or conduit of larger cross section area than the influent pipe (i.e., pre-treatment line 16). The influent pipe is then connected to the pipe with larger cross section area of packed section through the expansion section 31.

Figure 4:
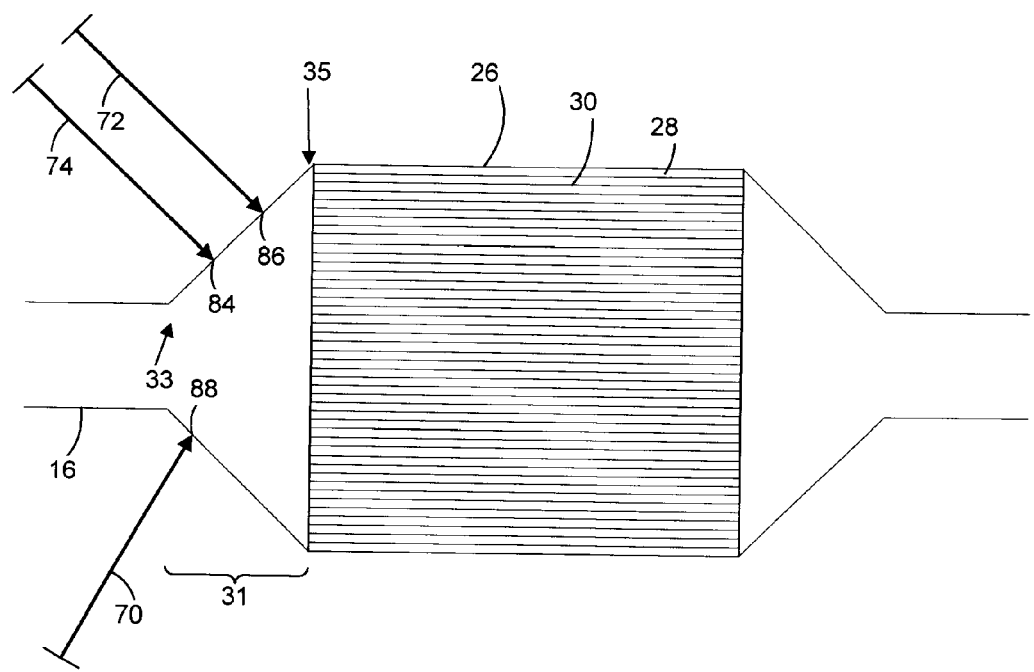
FIG. 4 is a schematic diagram of an exemplary expansion section and monolith according to the present invention.

The expansion section 31 is shown only schematically in FIGS. 1, 2, 7, and 8. FIG. 4 more accurately shows an exemplary shape of the expansion section 31, which is located between the pre-treatment line 16 and the monolith 26. As seen in FIG. 4, the pre-treatment line 16 connects to an upstream end 33 of the expansion section 31. The upstream end 33 has a cross-sectional area that is approximately equal to the adjacent end of the pre-treatment line 16. Moving towards the downstream end 35 of the expansion section 31 (i.e., closer to the monolith 26, or to the right as shown in FIG. 4), the cross-sectional area of the expansion section 31 increases so that it is greater than the cross-sectional area at the upstream end 33. In some embodiments, the cross-sectional area at the downstream end 35 is preferably at least twice the first cross-sectional area at the upstream end 33.

As stated above, the present invention represents an improvement over known systems because it decreases the velocity of the water entering the packed section by the use of the expansion section 31. This concept may be counterintuitive to those having ordinary skill in the art because the slowing water velocity in the expansion section 31 may enhance the bubble coalescence and phase separation. A static mixer also cannot be used to effectively distribute the gas bubbles in the expansion section upstream of the monolith because the fluid velocity is lower than the optimum required for the static mixers. Note that in the methods that use a static mixer along with a gas injection device such as a venturi eductor or gas nozzles, the velocity of the fluid is maintained constant downstream of ozone gas injection in order to prevent separation of the fluid phases.

Where the apparatus is oriented horizontally, if the gas is injected in the influent pipe using the traditional gas injection methods such as a gas nozzle or a venturi educator, the gas bubbles will rise and coalesce in the expansion section 31 ahead of the monolith 26 to create a separate gas phase at the top of the expansion section 31. Also, when the full volumetric flow of the influent water is passed through the in-line venturi eductor then considerable energy loss is incurred due to the large pressure drop across the eductor.

The present invention addresses this problem by using only a fraction of the influent water volume to create the gas dispersion that enters the monolith 26. FIG. 4 also shows how ozone gas is directly injected into the expansion section at injection points 84, 86, 88 in the embodiment of FIG. 1.

Reference will now be made to the embodiments of FIGS. 7 and 8. For applications where the water to be treated is fairly clear of suspended particles such as drinking water after coagulation and filtration, i.e., where the ozone dose required for the water treatment is relatively low, the gas diffusers (which may take the form of gas spargers) are placed ahead of the monolith in the expansion section, without the need for a side stream. Referring to the embodiment of FIG. 7, multiple diffusers (i.e., gas spargers 382a, 382b) may be used to more uniformly distribute the gas within the expansion section 331 and to avoid coalescence of the gas bubbles where the monolith 326 is oriented horizontally. It should be understood that any number of diffusers could be used at any number of injection points in the expansion section 331 within the scope of this invention. The cross flow of the influent water entering the expansion section 331 through the influent water stream 312 will carry the gas bubbles generated by the injected gas into the monolith 326 for ozone mass transfer inside the microchannels 328 thereof. The diffusers could be made of ceramic, polymer or sintered metal and can be shaped as semi-circular or as straight pipes, depending on the shape of the monolith, in order to achieve substantially uniform gas distribution across the entire cross-sectional area of the entrance (i.e., upstream) end of the monolith 326.

Figure 8:
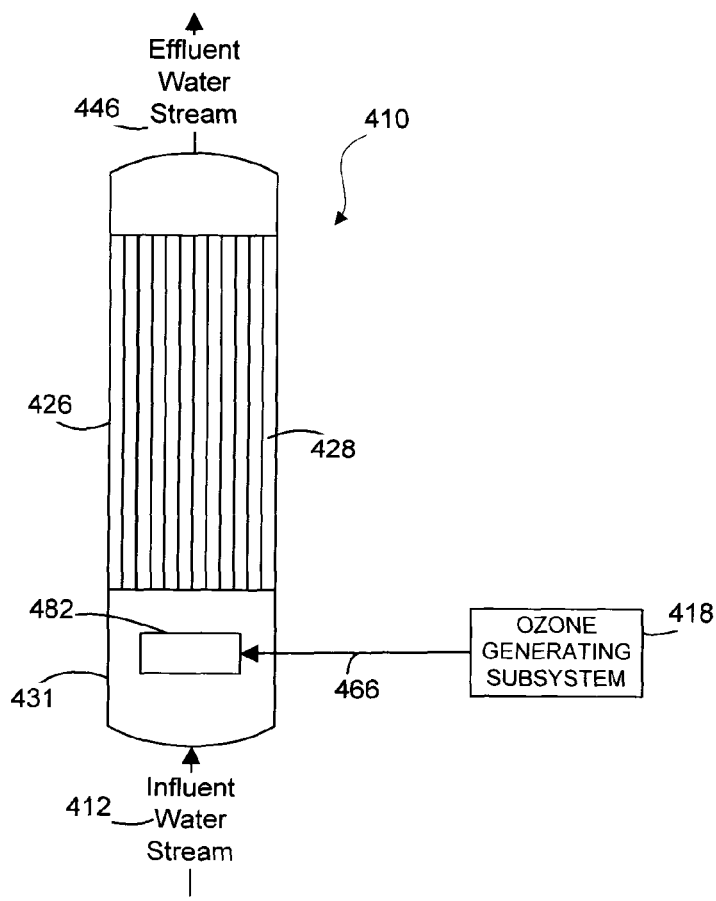
FIG. 8 is a schematic diagram of a portion of a fourth exemplary embodiment of the present invention.

Referring to the embodiment shown in FIG. 8, in embodiments where the monolith 426 is oriented vertically upward (i.e., where the downstream end of the monolith 426 opposes gravity), then the diffuser (gas sparger 482) can be placed in a square or rectangular grid in the center of the expansion section 431. Due to the orientation of this embodiment, the gas bubbles will not readily coalesce, and the single gas sparger 482 maintains the gas bubbles sufficiently separated until they enter the microchannels 428 of the monolith 426. It should be understood that any number of diffusers could be used at any number of injection points in the expansion section 431 within the scope of this invention.

It should be understood that the structured packing section (monolith) can be oriented for vertical-up, vertical-down, or horizontal fluid flow. The number, orientation, and location of the injection nozzle(s) or diffuser(s) can be modified based on the orientation of the packed section, within the scope of this invention. For the horizontal orientation of the packed section, the injection nozzle(s) will be located in order to minimize the separation and coalescence of the gas bubbles in the top part of the expansion section.

Figure 7:
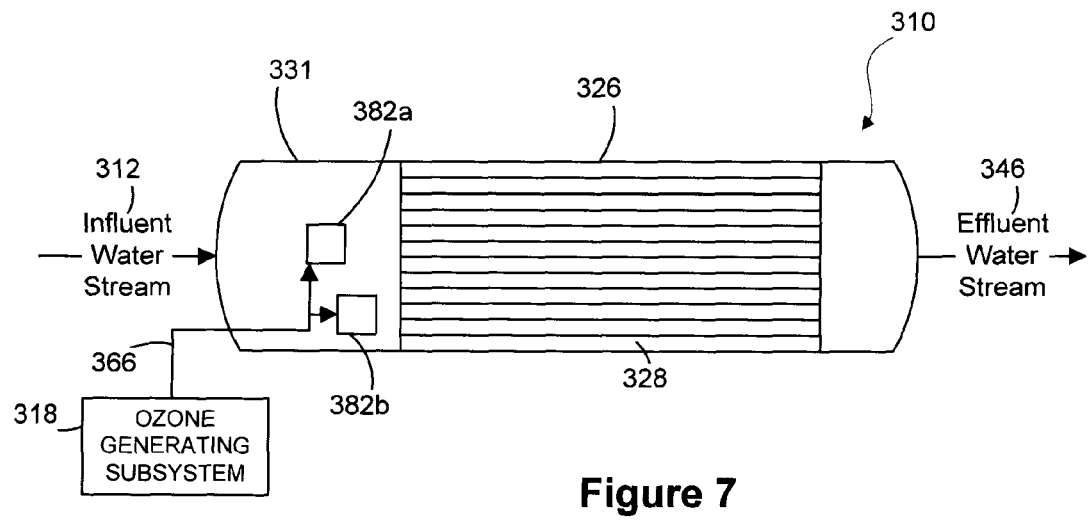
FIG. 7 is a schematic diagram of a portion of a third exemplary embodiment of the present invention.

It should be further understood that the apparatus of the embodiments shown in FIGS. 7 and 8 could be incorporated within the overall systems as approximately shown in FIGS. 1 and 2, i.e., within a separator vessel, having an ozone destruct unit, etc.

The apparatus with the structured packing (monolith) and the diffusers is superior to the basin reactor with diffusers because in this invention the diffuser(s) are used only for gas bubble distribution and not for mixing in the water phase. The mass transfer of the ozone from gas bubbles to the liquid phase occurs inside the monolith 426. Therefore, unlike basin reactor systems, in these configurations the mass transfer of ozone does not suffer when the gas flow is reduced during low-ozone demand periods.

The amount of ozone containing gas that is injected in the side stream is dependent on the type and concentration of the contaminant in the influent water, and the concentration of ozone in the gas stream. The gas-to-liquid ratio in the side stream is dependent on the volume fraction of side stream flow compared to the total flow. The ozone dose could range from 2 mg of ozone per liter of water pumped through the side stream to 80 mg/L. For highly-contaminated water such as that water found in farm runoff, where advanced oxidation may be needed to treat the chemical contamination by pesticides, herbicides, etc., the total ozone requirement may be much higher than that required for basic disinfection. Most disinfection applications require ozone up to 5 mg per liter of treated water. For EDC-removal applications, the ozone demand could be in the range of 2 mg/L up to a maximum of 20 mg/L of treated water.

In this example, the system 10 is configured so that the gas-liquid mixture flows downwardly through the monolith 26. In other embodiments, the monolith 26 could be oriented for vertical-up or horizontal flow. It should be noted that vertical-up and horizontal flow orientations are more practical in applications where ozone demand, and therefore the gas-liquid ratio of the mixture entering the monolith 26, is lower. The length of monolith 26 can be selected to achieve a desired ozone mass transfer efficiency, with higher efficiency resulting from a longer monolith 26.

In this embodiment, the monolith 26 discharges into a gas-liquid phase separator vessel 34. In this embodiment, gas that collects in the vessel 34 is vented to a gas purge line 40 that is preferably connected to an ozone destruct unit 42. The ozone destruct unit 42 converts any remaining ozone from the gas purge line 40 into oxygen and vents the oxygen gas to the atmosphere. Optionally, a gas recycle line 44 may recirculate gas from the vessel 34 to the ozone generating subsystem 18 (or to a point that is either upstream or downstream from the ozone generator).

Treated water is removed from the vessel 34 through an output line 38 located at the lower end of the vessel 34. In some embodiments, a pump may be included in the output line 38 to enable at least a portion of the treated water to be recirculated through the pre-treatment line 16. Water can also be discharged from the system 10 through an effluent line 46.

In some embodiments, an inlet port 52, which is connected to a supply of hydrogen peroxide, is preferably provided on the pre-treatment line 16 to enable hydrogen peroxide to be added to the treatment process (where advanced oxidation is required or desirable).

The system 10 can be adapted to provide a wide range of ozone dosing, i.e., the amount of ozone gas that is dissolved into the water during treatment. If a high level of ozone dosing desired, the flow rates of the influent and effluent streams 12, 46 can be reduced, so that a larger fraction of the water in the output line 38 that is recycled through the pre-treatment line 16.

As used herein, "ozone dosing" is intended to refer to the amount of ozone that has been consumed by water each time it is cycled through the mixing section 22 and would typically be measured by comparing the ozone content of the ozone feed line 66 to the ozone content in the gas purge line 40. "Total average ozone dosing" is intended to refer to the total ozone dose in the treated water as it exits the system 10 through the effluent line 46. The relationship between "ozone dosing" and "total average ozone dose" is a function of the fraction of the water in the output line 38 is recycled through the pre-treatment line 16.

Figure 5:
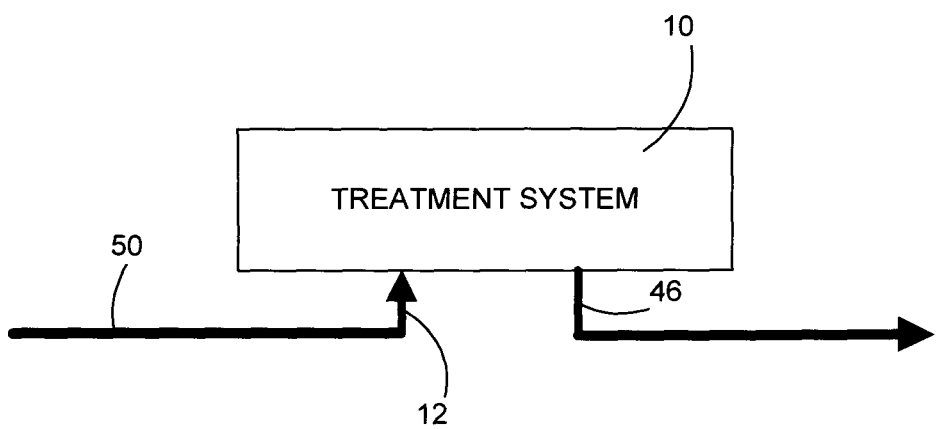
FIG. 5 is a schematic diagram showing an exemplary connection configuration for a water treatment system.
Figure 6:
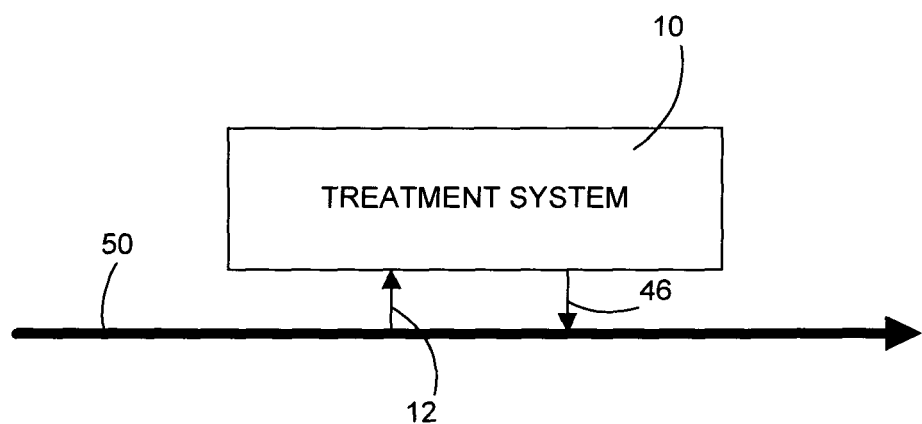
FIG. 6 is a schematic diagram showing a second exemplary connection configuration for a water treatment system.

FIG. 5 illustrates the configuration of the system 10 in which relatively high ozone dosing is desired. In this embodiment, the entire untreated water stream 50 is directed into the treatment system 10 by the influent stream 12. FIG. 6 illustrates a configuration of the system 10 in which relatively low ozone dosing is desired (e.g., 2-5 mg/L of water). In this configuration, only a portion of the water in the water line 50 is diverted into the treatment system 10 through the influent stream 12. Treated water is returned to the water stream 50 through the effluent stream 46, where it mixes with untreated water to provide a desired ozone dosing in the water stream 50. As shown in FIG. 6, the effluent line 46 preferably re-injects water into the water line 50 at a location that is downstream from the influent line 12.

As such, an invention has been disclosed in terms of preferred embodiments and alternate embodiments thereof. Of course, various changes, modifications, and alterations from the teachings of the present invention may be contemplated by those skilled in the art without departing from the intended spirit and scope thereof. It is intended that the present invention only be limited by the terms of the appended claims.

ASPECTS OF THE INVENTION

Aspect 1—A method for treating water, the method comprising:

(a) routing a water stream through a pre-treatment line;

(b) introducing the water stream from the pre-treatment line into an expansion section including an upstream end having a first cross-sectional area and a downstream end having a second cross-sectional area, the second cross-sectional area being greater than the first cross-sectional area;

(c) providing a gas stream containing at least 3% ozone gas;

(d) introducing the gas stream into the expansion section at at least one injection point while the water stream is flowing through the expansion section, resulting in a gas-liquid mixed-phase stream comprising ozone gas and water at the downstream end; and (e) passing the mixed-phase stream through a monolith located downstream from the expansion section, resulting in a reaction product in which at least a portion of the ozone gas is dissolved into the water.

Aspect 2—The method of a Aspect 1, wherein step (d) comprises:

(i) diverting a portion of the water stream from the pre-treatment line into at least one side stream;

(ii) introducing the gas stream into the side stream to form a gas-liquid mixture; and (iii) injecting the gas-liquid mixture into the expansion section at the at least one injection point.

Aspect 3—The method of any of Aspects 1 through 2, further comprising:

(f) increasing the pressure of the portion of the water stream in the at least one side stream to a second pressure, the water stream in the pre-treatment line having a first pressure, the second pressure being greater than the first pressure.

Aspect 4—The method of Aspect 3, wherein step (f) is performed by a pumping apparatus located in flow communication with the at least one side stream.

Aspect 5—The method of any of Aspects 2 through 4, further comprising splitting the at least one side stream into a plurality of side streams downstream from where step (d)(ii) is performed.

Aspect 6—The method of any of Aspects 2 through 5, further comprising splitting the at least one side stream into a plurality of side streams upstream from where step (d)(ii) is performed, wherein step (d)(ii) further comprises introducing the gas stream into each of the plurality of side streams to form a gas-liquid mixture in each of the plurality of side streams, and wherein step (d)(iii) further comprises injecting the gas-liquid mixture from each of the plurality of side streams into the expansion section at the at least one injection point.

Aspect 7—The method of Aspect 6, the at least one injection point comprising a plurality of injection points, wherein step (d)(iii) further comprises injecting the gas-liquid mixture from each of the plurality of side streams into the expansion section at a different one of the plurality of injection points.

Aspect 8—The method of any of Aspects 2 through 7, wherein step (b) comprises introducing the water stream from the pre-treatment line into an expansion section including an upstream end having a first cross-sectional area and a downstream end having a second cross-sectional area, the second cross-sectional area being at least twice the first cross-sectional area.

Aspect 9—The method of any of Aspects 2 through 8, wherein step (d) comprises introducing the gas stream into the expansion section at at least one injection point, the at least one injection point comprising a gas diffuser.

Aspect 10—The method of any of Aspects 1 through 9, further comprising:

(g) separating any undissolved gas in the reaction product from a liquid-phase portion of the reaction product; and (h) diverting at least a portion of the liquid-phase portion of the reaction product to an effluent stream.

Aspect 11—The method of Aspect 10, further comprising:

(i) recirculating at least part of the liquid-phase portion of the reaction product into the water stream in the pre-treatment line.

Aspect 12—The method of any of Aspects 1 through 11, further comprising:

(j) injecting hydrogen peroxide into the water stream upstream from the monolith.

Aspect 13—The method of any of Aspects 1 through 12, wherein step (e) comprises passing the mixed-phase stream through a monolith downstream from the at least one injection point, the monolith having a catalyst impregnated thereon, resulting in at least a portion of the ozone gas being dissolved into the water stream and transfer of at least a portion of the dissolved ozone to the catalyst surface for reaction.

Aspect 14—The method of any of Aspects 1 through 13, further comprising:

(k) diverting a portion of the water stream to form an influent stream;

(l) injecting the influent stream into the pre-treatment stream; and (m) injecting the effluent stream into the water stream downstream from the influent stream.

Aspect 15—A water treatment system comprising:

a pre-treatment line including a water stream;

an expansion section connected in flow communication along the pre-treatment line, the expansion section comprising an upstream end having a first cross-sectional area and a downstream end having a second cross-sectional area, the second cross-sectional area being greater than the first cross-sectional area;

a gas stream containing at least 3% ozone gas, the gas stream being in flow communication with the expansion section at at least one injection point; and a monolith having an outlet end and an inlet end and being in flow communication with the pre-treatment line, the outlet and inlet ends being downstream from the expansion section, the monolith having a plurality of channels therein through which the water stream and gas stream may travel.

Aspect 16—The water treatment system of Aspect 15, further comprising at least one side stream located upstream of the expansion section, the at least one side stream having a first end that branches off of the pre-treatment line and a second end opposite the first end that is in flow communication with the expansion section, wherein a portion of the water from the water stream in the pre-treatment line is routed through the at least one side stream.

Aspect 17—The water treatment system of Aspect 16, wherein the at least one side stream comprises a plurality of side streams, wherein each of the plurality of side streams begins at a furcation point and terminates at and is in flow communication with the expansion section at a respective one of a plurality of injection points.

Aspect 18—The water treatment system of Aspect 17, wherein the gas stream is in flow communication with each of the plurality of side streams at a different one of a plurality of junctions, each of the plurality of junctions being located downstream of the furcation point.

Aspect 19—The water treatment system of Aspect 16, wherein the gas stream is in flow communication with the at least one side stream at a juncture.

Aspect 20—The water treatment section of Aspect 19, wherein the juncture is located upstream of a furcation point, wherein at the furcation point the at least one side stream divides into a plurality of side streams, wherein each of the plurality of side streams terminates at and is in flow communication with the expansion section at a respective one of a plurality of injection points.

Aspect 21—The water treatment system of any one of Aspects 16 through 20, further comprising a pressurizing apparatus located in the at least one side stream that increases the pressure of the water located in the at least one side stream.

Aspect 22—The water treatment system of any one of Aspects 15 through 21, wherein the monolith comprises a plurality of parallel channels.

Aspect 23—The water treatment system of any one of Aspects 15 through 22, further comprising a hydrogen peroxide port that is in flow communication with the water stream and is connected to a supply of hydrogen peroxide.

Aspect 24—The water treatment system of any one of Aspects 15 through 23, wherein the second cross-sectional area is at least twice the first cross-sectional area.

Aspect 25—A method of treating water, the method comprising:
(a) routing a water stream through a pre-treatment line;
(b) diverting a portion of the water stream from the pre-treatment line into at least one side stream, the side stream branching off of the pre-treatment line at a diversion point;
(c) providing an output gas stream containing ozone gas;
(d) introducing the output gas stream to the water in the at least one side stream at at least one injection point, resulting in a mixed-phase stream comprising ozone gas and water downstream of the at least one injection point;
(e) introducing the mixed-phase stream into the water stream at a reintroduction point located downstream from the diversion point.

Aspect 26—The method of Aspect 25, further comprising:
(f) prior to performing step (d), pressurizing the portion of the water in the at least one side stream to a second pressure, the water in the water stream in the pre-treatment line having a first pressure, the second pressure being greater than the first pressure.

Aspect 27—The method of any one of Aspects 25 through 26, further comprising:
(g) providing the reintroduction point in an expansion section having an upstream end having a first cross-sectional area and a downstream end having a second cross-sectional area, the second cross-sectional area being greater than the first cross-sectional area.

Aspect 28—The method of Aspect 27, wherein step (g) comprises providing the reintroduction point in an expansion section having an upstream end having a first cross-sectional area and a downstream end having a second cross-sectional area, the second cross-sectional area being at least twice the first cross-sectional area.

The invention claimed is:
1. A method for treating water, the method comprising:
(a) routing a water stream through a pre-treatment line;
(b) introducing the water stream from the pre-treatment line into an expansion section including an upstream end having a first cross-sectional area and a downstream end having a second cross-sectional area, the second cross-sectional area being greater than the first cross-sectional area;
(c) providing a gas stream containing at least 3% ozone gas;
(d) introducing the gas stream into the expansion section and the water stream at at least one injection point while the water stream is flowing through the expansion section, the at least one injection point located upstream of a monolith resulting in a gas liquid mixed-phase stream comprising ozone gas and water at the downstream end; and
(e) passing the mixed-phase stream through the monolith located downstream from the expansion section, resulting in a reaction product in which at least a portion of the ozone gas is dissolved in the water.

2. The method of claim 1, wherein step (d) comprises:
(i) diverting a portion of the water stream from the pre-treatment line into at least one side stream;
(ii) introducing the gas stream into the side stream to form a gas-liquid mixture; and
(iii) injecting the gas-liquid mixture into the expansion section at the at least one injection point.

3. The method of claim 2, further comprising:
(f) increasing the pressure of the portion of the water stream in the at least one side stream to a second pressure, the water stream in the pre-treatment line having a first pressure, the second pressure being greater than the first pressure.

4. The method of claim 3, wherein step (f) is performed by a pumping apparatus located in flow communication with the at least one side stream.

5. The method of claim 2, further comprising splitting the at least one side stream into a plurality of side streams downstream from where step (d)(ii) is performed.

6. The method of claim 2, further comprising splitting the at least one side stream into a plurality of side streams upstream from where step (d)(ii) is performed, wherein step (d)(ii) further comprises introducing the gas stream into each of the plurality of side streams to form a gas-liquid mixture in each of the plurality of side streams, and wherein step (d)(iii) further comprises injecting the gas-liquid mixture from each of the plurality of side streams into the expansion section at the at least one injection point.

7. The method of claim 6, the at least one injection point comprising a plurality of injection points, wherein step (d)(iii) further comprises injecting the gas-liquid mixture from each of the plurality of side streams into the expansion section at a different one of the plurality of injection points.

8. The method of claim 2, wherein step (b) comprises introducing the water stream from the pre-treatment line into an expansion section including an upstream end having a first cross-sectional area and a downstream end having a second cross-sectional area, the second cross-sectional area being at least twice the first cross-sectional area.

9. The method of claim 2, wherein step (d) comprises introducing the gas stream into the expansion section at at least one injection point, the at least one injection point comprising a gas diffuser.

10. The method of claim 1, further comprising:
(g) separating any undissolved gas in the reaction product from a liquid-phase portion of the reaction product; and
(h) diverting at least a portion of the liquid-phase portion of the reaction product to an effluent stream.

11. The method of claim 10, further comprising:
(i) recirculating at least part of the liquid-phase portion of the reaction product into the water stream in the pre-treatment line.

12. The method of claim 1, further comprising:
(j) injecting hydrogen peroxide into the water stream upstream from the monolith.

13. The method of claim 1, wherein step (e) comprises passing the mixed-phase stream through a monolith downstream from the at least one injection point, the monolith having a catalyst impregnated thereon, resulting in at least a portion of the ozone gas being dissolved into the water stream and transfer of at least a portion of the dissolved ozone to the catalyst surface for reaction.

14. The method of claim 1, further comprising:
(k) diverting a portion of the water stream to form an influent stream;

(l) injecting the influent stream into the pre-treatment stream; and
(m) injecting the effluent stream into the water stream downstream from the influent stream.

\* \* \* \* \*